United States Patent
Kocberber et al.

(10) Patent No.: US 10,892,961 B2
(45) Date of Patent: Jan. 12, 2021

(54) APPLICATION- AND INFRASTRUCTURE-AWARE ORCHESTRATION FOR CLOUD MONITORING APPLICATIONS

(71) Applicant: Oracle International Corporation, Redwood Shores, CA (US)

(72) Inventors: Onur Kocberber, Baden-Daettwil (CH); Felix Schmidt, Baden-Daettwil (CH); Craig Schelp, Vancouver (CA); Pravin Shinde, Zurich (CH)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/271,535

(22) Filed: Feb. 8, 2019

(65) Prior Publication Data
US 2020/0259722 A1    Aug. 13, 2020

(51) Int. Cl.
*H04L 12/24*    (2006.01)
*H04L 12/26*    (2006.01)
(Continued)

(52) U.S. Cl.
CPC ...... *H04L 41/5054* (2013.01); *G06F 9/45558* (2013.01); *H04L 41/024* (2013.01);
(Continued)

(58) Field of Classification Search
CPC .......... G06F 2009/4557; H04L 5/0064; H04L 41/5009; H04L 63/1408; H04L 43/08
See application file for complete search history.

(56) References Cited

U.S. PATENT DOCUMENTS 6,594,666 B1    7/2003    Biswas
6,782,394 B1    8/2004    Landeck
(Continued)

OTHER PUBLICATIONS

Liu et al., "Survey of Real-time Processing Systems for Big Data", IDEAS '14 Jul. 7-9, 2014, Porto, Portugal Copyright 2014 ACM, 6 pages.
(Continued)

*Primary Examiner* — Barbara B Anyan
(74) *Attorney, Agent, or Firm* — Hickman Palermo Becker Bingham LLP

(57) ABSTRACT

Herein are computerized techniques for autonomous and artificially intelligent administration of a computer cloud health monitoring system. In an embodiment, an orchestration computer automatically detects a current state of network elements of a computer network by processing: a) a network plan that defines a topology of the computer network, and b) performance statistics of the network elements. The network elements include computers that each hosts virtual execution environment(s). Each virtual execution environment hosts analysis logic that transforms raw performance data of a network element into a portion of the performance statistics. For each computer, a configuration specification for each virtual execution environment of the computer is automatically generated based on the network plan and the current state of the computer network. At least one virtual execution environment is automatically tuned and/or re-provisioned based on a generated configuration specification.

45 Claims, 8 Drawing Sheets

(51) Int. Cl.
   *G06F 9/455* (2018.01)
   *H04L 29/08* (2006.01)
(52) U.S. Cl.
   CPC ...... *H04L 41/0246* (2013.01); *H04L 41/0859* (2013.01); *H04L 41/5009* (2013.01); *H04L 41/5045* (2013.01); *H04L 41/5048* (2013.01); *H04L 43/10* (2013.01); *G06F 2009/45591* (2013.01); *G06F 2009/45595* (2013.01); *H04L 67/10* (2013.01)

(56) References Cited

U.S. PATENT DOCUMENTS

| | | |
|---|---|---|
| 6,954,764 B2 | 10/2005 | Biswas |
| 7,162,691 B1 | 1/2007 | Chatterjee |
| 7,386,797 B1 | 6/2008 | Chatterjee |
| 7,555,710 B2 | 6/2009 | Kobashi |
| 7,640,242 B2 | 12/2009 | Chatterjee |
| 7,644,051 B1 | 1/2010 | Moore |
| 7,747,591 B2 | 6/2010 | Chatterjee |
| 8,145,641 B2 | 3/2012 | Chatterjee |
| 8,352,453 B2 | 1/2013 | Chatterjee |
| 8,578,269 B2 | 11/2013 | Osaka |
| 8,732,291 B2 | 5/2014 | Zhu et al. |
| 8,896,876 B2 | 11/2014 | Osaka |
| 8,955,112 B2 | 2/2015 | Nguyen et al. |
| 9,378,461 B1 | 6/2016 | Chatterjee |
| 9,430,213 B2 | 8/2016 | Fu et al. |
| 9,667,489 B2 | 5/2017 | Morris et al. |
| 9,703,890 B2 | 7/2017 | Kakaraddi et al. |
| 9,720,763 B2 | 8/2017 | Rajasekharah et al. |
| 10,158,726 B2 | 12/2018 | Chou et al. |
| 10,185,345 B2 | 1/2019 | Hanley |
| 2005/0253795 A1 | 11/2005 | Moriya et al. |
| 2009/0326728 A1 | 12/2009 | Chrisop |
| 2010/0010678 A1 | 1/2010 | Dawson |
| 2010/0321574 A1 | 12/2010 | Kerofsky |
| 2011/0289329 A1 | 11/2011 | Bose |
| 2011/0302431 A1 | 12/2011 | Diab |
| 2011/0316337 A1 | 12/2011 | Pelio |
| 2012/0005683 A1 | 1/2012 | Bower |
| 2012/0016528 A1 | 1/2012 | Raman |
| 2014/0018969 A1 | 1/2014 | Forbes |
| 2014/0039965 A1 | 2/2014 | Steven |
| 2014/0337516 A1 | 11/2014 | Naseh et al. |
| 2015/0214737 A1 | 7/2015 | Ichino |
| 2016/0370814 A1 | 12/2016 | Hanley |
| 2017/0214273 A1 | 7/2017 | Kogo |
| 2017/0228649 A1 | 8/2017 | Chatterjee |
| 2017/0295082 A1* | 10/2017 | Wu .................. H04L 67/10 |
| 2017/0366428 A1 | 12/2017 | Shaw et al. |
| 2018/0295154 A1* | 10/2018 | Crabtree ............ H04L 63/1408 |
| 2019/0041845 A1* | 2/2019 | Cella ................. G05B 13/028 |
| 2020/0133688 A1 | 4/2020 | Shinde |

OTHER PUBLICATIONS

Liu et al., "Cloud Resource Orchestration: A DataCentric Approach", 5th Biennial Conference on Innovative Data Systems Research (CIDR '11) Jan. 2011, Asilomar, California, USA, 8 pages.
Calcaterra et al., "Combining TOSCA and BPMN to Enable Automated Cloud Service Provisioning" dated 2017, 10 pages.
Cisco Public, "Cisco CloudCenter Solution: Architecture Overview", dated 2017, 10 pages.
Cloud Tidbits Column, "Containers and Cloud: From LXC to Docker to Kubernetes", dated Sep. 2014, 4 pages.
Dukaric, "Towards a Unified Taxonomy and Architecture of Cloud Frameworks", Future Generation Computer Systems dated 2013, 5 pages.
Fujitsu, "Fujitsu FlexFrame® Orchestrator V1.1A Solution", Data Sheet, FlexFrame® Orchestrator V1.1A, dated Dec. 15, 2014, 6 pages.
IBM, "IBM Cloud Orchestrator Enterprose Edition Extends Cloud Management Capabilities of IBM Cloud Orchestrator with Integrated Monitoring and Cost Management" dated Dec. 15, 2015, 12 pages.
Katsaros et al., "Cloud application portability with TOSCA, Chef and Openstack", dated Mar. 2014, 9 pages.
Kontena at Github, "The Automated Container Deployment Pipeline", Dated Feb. 9, 2017, 8 pages.
Andrikopoulos et al., "Optimal Distribution of Applications in the Cloud", dated 2014, 6 pages.
Kouchaksaraei et al., "Pishahang: Joint Orchestration of Network Function Chains and Distributed Cloud Applications", dated 2018, 3 pages.
Yamato et al., "Proposal of Optimum Application Deployment Technology for Heterogeneous IaaS Cloud", Proceedings of 2016 6th International Workshop on Computer Science and Engineering, 4 pages.
Octopus Deploy, "Getting Started" https://octopus.com/docs/getting-started, last viewed on Apr. 17, 2019, 8 pages.
Prassanna et al., "A Review of Existing Cloud Automation Tools", dated 2017, 4 pages.
Shalom, Nati, "Orchestration Tool Roundup—Docker Swarm vs. Kubernetes, TerraForm vs. TOSCA/Cloudify vs. Heat", dated Jun. 11, 2015, 9 pages.
Sonata, "D7.5 Market Fesibility Study", dated Jan. 5, 2015, 75 pages.
System Evolution, "Borg, Omega, and Kubernetes", dated 2016, 24 pages.
Varma et al., "Comparative Study of Various Platform as a Service Frameworks", International Journal on Cloud Computing: Services and Architecture (IJCCSA) vol. 6, No. 1, Feb. 2016, 12 pages.
Wettinger et al., "Integrating Configuration Management with Model-driven Cloud Management based on TOSCA", dated 2013, 7 pages.
Yamato et al., "Development of Template Management Technology for Easy Deployment of Virtual Resources on OpenStack", Journal of Cloud Computing: Advances, Systems and Applications dated 2014, 12 pgs.
Kouchaksaraei et al., "Joint Orchestration of Cloud-Based Microservices and Virtual Network Functions", dated Jan. 1, 2018, 2 pages.
Shinde et al., "Intelligent NIC Queue Management in the Dragonet Network Stack", dated 2015, 2 pages.
OpenConfig, "Observations on Modelling Configuration and State in YANG", dated Jan. 2018, 17 pages.
NS-3, Network Simulator, "ns-3 Tutorial", ns-3 project, dated Mar. 21, 2018, 127 pages.
Kourtis et al., "Intelligent NIC Queue Management in the Dragonet Network Stack", dated 2015, 15 pages.
Jason Edelman's Blog, "OpenConfig, Data Models, and APIs", http://jedelman.com/home/openconfig-data-models-and-apis/, dated Dec. 21, 2015, 15 pages.
Alvarez Santiago, "Getting Started with OpenConfig", Cisco, dated 2016, 43 pages.
Shinde, U.S. Appl. No. 16/174,582, filed Oct. 30, 2018, Office Action, dated Jun. 1, 2020.
Chatterjee, U.S. Appl. No. 15/192,961, filed Jun. 24, 2016, Office Action, dated Mar. 17, 2020.
A.J. Hildebrand, "Combinatorial Probabilities", Math 408, Actuarial Statistics I, dated 2008, 2 pages.

* cited by examiner

APPLICATION- AND INFRASTRUCTURE-AWARE ORCHESTRATION FOR CLOUD MONITORING APPLICATIONS

FIELD OF THE INVENTION

The present invention relates to computer cloud monitoring. Herein are techniques for autonomous and artificially intelligent administration of a computer cloud health monitoring system.

BACKGROUND

Computer cloud monitoring applications are unique because they require information from the entire datacenter computing stack (e.g., compute, network, applications). Orchestrating (e.g., deploying, monitoring, configuring) such monitoring involves awareness of both datacenter status and application requirements at the same time, for correctness and performance reasons as discussed later herein.

A health monitoring application may have difficulty identifying and/or obtaining representative telemetry from problematic parts of the infrastructure. Given that which points in datacenter infrastructure are aberrant or fragile can change dynamically, an orchestration service may be unaware of the current state of the infrastructure, the monitoring platform, and related software running on the platform. The state of the art lacks such cross-layer monitoring orchestration mechanisms as follows.

The state of the monitoring art also lacks scaling up or down by reacting to changes in the infrastructure and incoming telemetry (i.e. monitoring load intensity). None of the existing orchestration solutions are able to provision and configure health monitoring applications. State-of-the-art datacenter management tools from the industry are not comprehensive and may be limited to one narrow responsibility, such as: i) container management, ii) infrastructure management, or iii) configuration management.

The container-based solutions include tools such as Kubernetes or Docker swarm. These container management systems somewhat allow for scaling up and down container-based deployments on virtual machines (VMs), bare-metal servers, and hybrid clouds. Some of these tools also manage container configuration files and a storage subsystem.

Infrastructure management systems such as Terraform, Ansible, and OpenStack Heat are not specifically tied to any deployment medium (e.g., VM or container), and hence provide a little more flexibility. Some of them include dashboarding and logging mechanisms that may partially facilitate effective resource management.

Configuration tools such as Chef provide configuration services for clusters but only operate on an already provisioned instance (e.g., VM, container, bare-metal OS). However, none of the tools of any kind has a cross-layer, vertical mechanism that achieves systematic infrastructure, platform and application aware orchestration for integrating deployment and monitoring. None of them have a mechanism that facilitates live application configuration updates to an already deployed instance (VM or container, as discussed later herein). There is no existing solution that provides dynamic configuration file generation with respect to an actual datacenter state and topology. None of those solutions establish a feedback loop for monitoring and reconfiguration of cloud health monitoring infrastructure itself. Thus, the state of the monitoring art operates sub-optimally when cloud health needs monitoring most, such as when datacenter homeostasis or throughput is impacted by uneven or heavy workload or localized outage.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Herein are computerized techniques for autonomous and artificially intelligent administration of a computer cloud health monitoring system. In an embodiment, an orchestration computer automatically detects a current state of network elements of a computer network by processing: a) a network plan that defines a topology of the computer network, and b) performance statistics of the network elements. The network elements include computers that each hosts virtual execution environment(s). Each virtual execution environment hosts analysis logic that transforms raw performance data of a network element into a portion of the performance statistics. For each computer, a configuration specification for each virtual execution environment of the computer is automatically generated based on the network plan and the current state of the computer network. At least one virtual execution environment is automatically tuned and/or re-provisioned based on a generated configuration specification.

For example, a running (e.g. VM) instance may be re-provisioned. In another example, application/analysis parameters may be adjusted (e.g. to increase efficiency), perhaps without reconfiguring a (e.g. shared) VM.

In an embodiment, a uniform lifecycle of operating states is superimposed upon a virtual execution environment based on the virtual execution environment's status and behavior. In an embodiment, analysis logic is templatized and then specialized on a per-deployment basis. In an embodiment, heartbeats, configuration revision numbers, and/or consensus voting increase accuracy of lifecycle observance. For example, lifecycle state changes may be asynchronous, autonomous, unexpected, and/or incompletely propagated throughout the cloud.

1.0 Example Orchestration Computer

Figure 1:
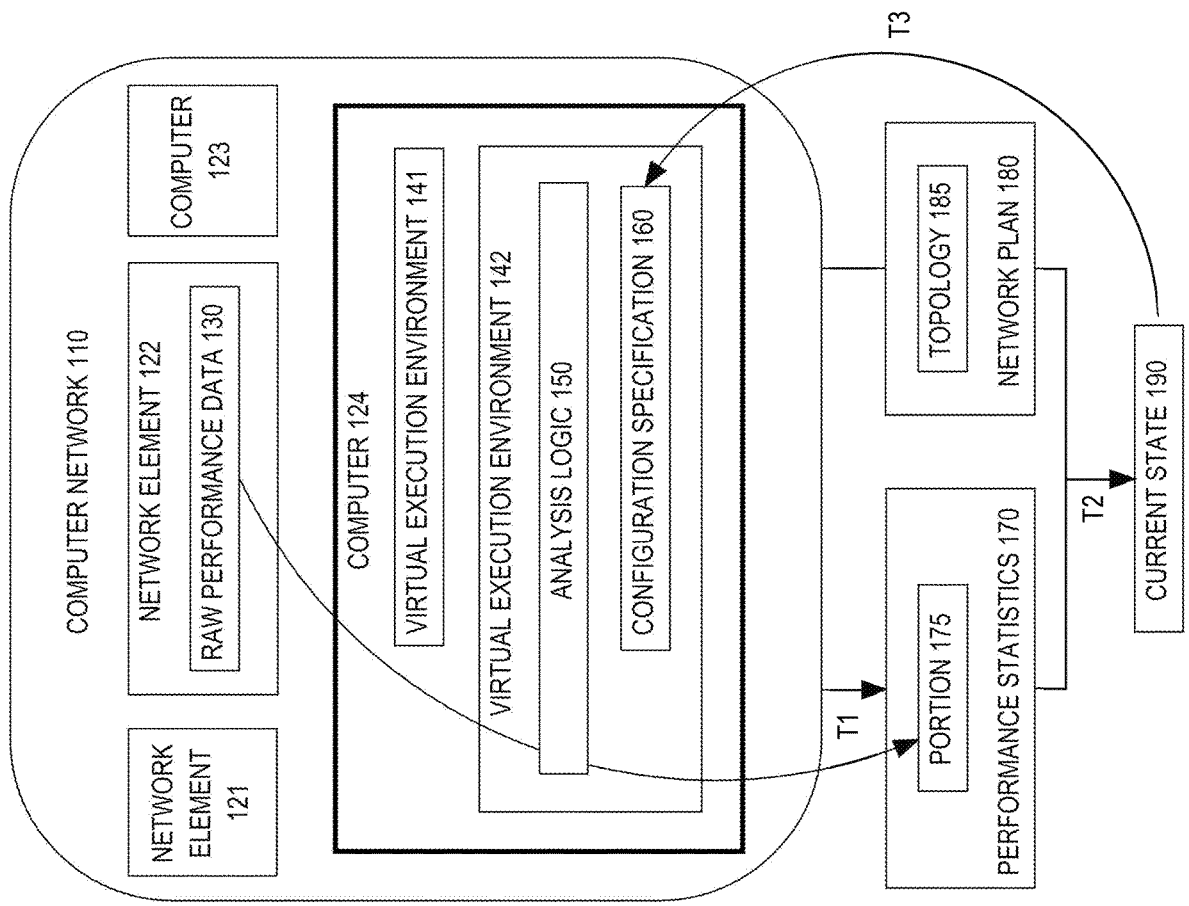
FIG. 1 is a block diagram that depicts an example orchestration computer that re-provisions virtual execution environments in a computer network topology, such as a cloud.

FIG. 1 is a block diagram that depicts an example orchestration computer 100, in an embodiment. Computer 100 re-provisions virtual execution environments in a computer network topology, such as a cloud. Computer 100 may be one or more of a rack server such as a blade, a personal computer, a mainframe, a smartphone, or other computing device such as a virtual machine.

Computer 100 maintains data structures that record dynamic status of interconnected network elements 121-124 within computer network 110. Network elements may be computers, such as 123-124, or other devices such as network switches and network attached storage. Computer network 110 may be one or more (e.g. internetworked) local area networks (LANs) or other digital communication networks such as a packet switched network.

The current configuration of computer network 110 is recorded as network plan 180 that includes topology 185 as a logical arrangement (e.g. logical graph) of interconnected network elements 121-124. Each computer 123-124 may host one or more virtual execution environments 141-142 that operate as application program containers. For example, virtual execution environment 141 may be a virtual hardware machine such with a hypervisor. Virtual execution environment 141 may instead be one or multiple software jails, software zones, or other software containers such as Kubernetes or Docker. For example, a single virtual execution environment 141 may be a virtual hardware machine, including all of the software container instances that the virtual hardware machine hosts. In another embodiment, those hosted container instances may each be a separate virtual execution environment.

In an embodiment, virtual execution environment 141 is implemented using a native virtualization interface such as provided by a native operating system such as a Linux kernel. In an embodiment, virtual execution environment 141 is implemented with a virtualization abstraction interface such as libvirt or nspawn.

Virtual execution environment 141 is a managed container that may load and execute software according to remote administration (e.g. computer 100) that may monitor, adjust, and terminate the contained software. Virtual execution environments 141-142 may be aggregated as a pool of (e.g. idle) spares into which computer 100 may deploy software applications for execution. For example, virtual execution environments 141-142 may already be dedicated to executing applications. For example, computer 124 hosts virtual execution environment 142 that executes analysis logic 150.

In an embodiment, analysis logic 150 is a text script that contains imperative statements. In an embodiment, the text script is a Python or Lua script. In an embodiment, virtual execution environment 141 comprises a Python interpreter, a Java bytecode interpreter, or an embedded Lua virtual machine (VM).

Throughput of processing and/or communication within computer network 110 may vary according to the static capacity and dynamic load of network elements 121-124. Each of network elements 121-124 may monitor and record its own internal operating conditions, throughput, and backlog. For example, network element 122 collects raw performance data 130 that network element 122 may relay as telemetry that is remotely processed. For example, network element 122 may be an ethernet switch that measures and reports quantities such as packet collisions, port contention, connections, queue depth, packet loss, and processor load.

Network element 122 may send raw performance data 130 as remote telemetry to virtual execution environment 142 of computer 124 for processing by analysis logic 150. For example, raw performance data 130 may be sent in scheduled intervals, batches when accumulated, or as a more or less continuous stream of measurements, such as over a lingering connection with keep alives. Raw performance data 130 may be encoded as binary numbers or structures or as human readable text such as console log output, comma separated values (CSV), JavaScript object notation (JSON), or extensible markup language (XML).

Data 130 may be transported by hypertext transfer protocol (HTTP) such as for common gateway interface (CGI) or representational state (REST), user datagram protocol (UDP), or transport control protocol (TCP). Connectionless UDP achieves lower transmission overhead by sacrificing reliability such that packets may be lost, duplicated, or reordered. If raw performance data 130 occurs frequently, then inaccuracies caused by UDP may be naturally limited in time and scope due to natural replacement of stale measurements with fresh measurements of a same dimension (e.g. queue depth).

Times T1-T3 are demonstrative and indicative of a dataflow pipeline. At time T1, raw performance data 130 is emitted from network element 122, processed accordingly by analysis logic 150, and inserted as portion 175 into performance statistics 170. Performance statistics 170 are collective dynamic performance statuses for computer network 110 as a whole. For example, some or all of the network elements of computer network 110 may gather and relay their own raw performance data to various analysis logics, such as 150, that are executed by various virtual execution environments that are hosted by various computers. Thus, performance statistics 170 may have multiple portions, such as 175, that come from throughout computer network 110 for inclusion in performance statistics 170.

Computer 100 stores performance statistics 170, network plan 180, and current state 190 that is a more or less complete representation of computer network 110. At time T2, dynamic performance statistics 170 and static network plan 180 are combined to create current state 190.

In operation, computer 100 may receive a command (not shown) to reconfigure one or more virtual execution environments. For example, an administrator may decide to move an application from a low capacity (e.g. physical or virtual address space, disk space, or processor cores) virtual execution environment to a high capacity virtual execution environment on a same or different computer. Alternatively, computer 100 may spontaneously decide, such as based on dynamic performance statistics 170, to reconfigure one or more virtual execution environments. For example, computer 100 may have various autonomous reflexes that proactively or reactively respond to fluctuating operating conditions. For example, computer 100 may move an application to a better container and/or physical server with more resources (i.e., vertical scaling, scale-up) or replicate the application to an additional container such as for horizontal scaling (i.e., scale-out).

No matter which scenario, at time T3 computer 100 adjusts, replaces, or creates a configuration specification, such as 160, that details a target configuration for imposition upon a new or existing virtual execution environment to achieve an expected reconfiguration. For example, computer 100 may allocate virtual execution environment 142 from a pool (not shown) of idle virtual execution environments and repurpose environment 142 to host a particular application that is declared and/or configured in configuration specification 160.

In an embodiment, configuration specification 160 is portable (e.g. between comparable virtual execution environments). In an embodiment, configuration specification 160 is generated for particular virtual execution environment 142. Configuration specification 160 may be a self-contained declarative descriptor such as an XML file or a property file.

As shown, virtual execution environment 142 operates in two special ways. First, environment 142 collects and transforms telemetry. Second, environment 142 is itself subject to re-provisioning, such as at time T3. Thus, computer 100 may collaborate to tune or otherwise adjust the metrics gathering infrastructure itself of computer network 110. Thus, as computer network 110 evolves, so too may its health monitoring infrastructure also evolve. For example, analysis logic 150 may be part of the health monitoring infrastructure of computer network 110. In an embodiment, configuration specification 160 may specify a modification or replacement for analysis logic 150. Thus reconfiguration may cause deployment of new or adjusted health monitoring behaviors as described later herein.

2.0 Example Orchestration Process

Figure 2:
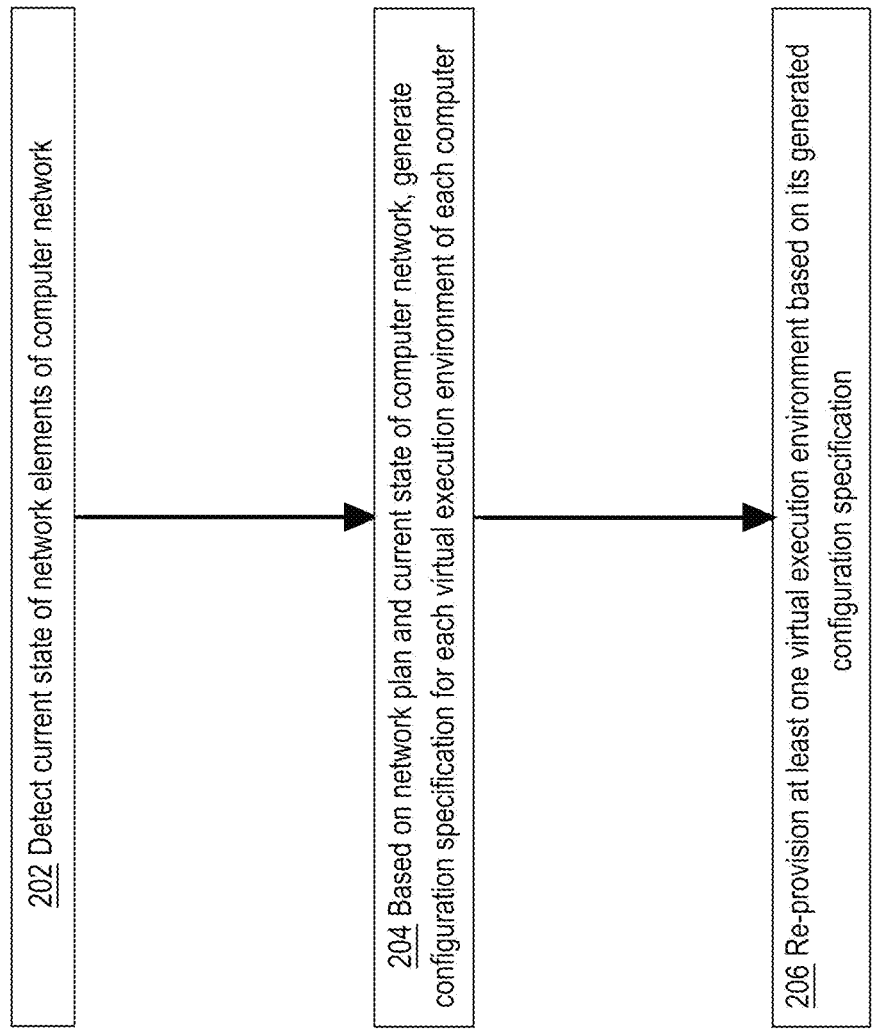
FIG. 2 is a flow diagram that depicts an example orchestration process for re-provisioning a virtual execution environment within a computer network topology.

FIG. 2 is a flow diagram that depicts orchestration computer 100 re-provisioning a virtual execution environment within a computer network topology, in an embodiment. FIG. 2 is discussed with reference to FIG. 1. The steps of FIG. 2 may: a) monitor the health of a computer network and its network elements, and b) responsively reconfigure distributed health monitoring infrastructure.

Step 202 detects the current state of network elements of a computer network. For example, network elements 121-124 may emit raw performance data, such as 130, that may be remotely harvested as telemetry. For example, network element 121 may be a serial or parallel, glass or metal communication cable whose performance degrades with age. A processing node, such as network element 122, may be a rack card such as a network switch or a blade computer, perhaps directly connected to cable 121, that tallies retransmissions or other communication errors such as garbled packets with checksum or parity errors. Cable 121 may have a lifecycle with plugged and (e.g. accidentally) unplugged states. In an embodiment, a bit error rate is calculated for cable 121.

Switch 122 may maintain raw performance data 130 that reflects the health of coupled network elements 121 and/or 122. Analysis logic 150 may retrieve raw performance data 130, perform preliminary analysis and transformation, and relay results to orchestration computer 100 for incorporation as portion 175 in performance statistics 170. Thus at time T1, computer 100 can detect the current state of cable 121 and other network elements within computer network 110.

Based on a network plan and the current state of the computer network, step 204 generates a configuration specification for each of any or all virtual execution environments of any or all computers in the computer network. For example, computer 100 may refer to topology 185 or other details of network plan 180 to discover: a) which other two network elements does cable 121 interconnect, b) what are the design characteristics (e.g. nominal capacity) of cable 121, and c) what other cable(s) may be redundant to cable 121.

Topology 185 may specify other more or less static metrics and attributes such as a communication buffer capacity, noise shielding, error detection/correction technique, and/or collision domain such as a hub or multidrop, manufacturer suggested metrics such as error rate, noise tolerance, and/or data rate. Network plan 180 may contain manufacturer specifications of equipment, including capacities and typical performance metrics. For example, a network switch may have a cache capacity for routing tables and active connections/sessions. Performance statistics 170 may have (e.g. corresponding) actually observed dynamic metrics (i.e. telemetry) such as switch cache hit/miss rates, buffer saturation (i.e. overflow) events, backlog/load (i.e. utilization) metrics, and/or actual or normalized data/error rates.

At time T2, that static information may be integrated with dynamic performance statistics 170 to synthesize current state 190 of computer network 110. Computer 100 may analyze current state 190 to detect that portion 175 for cable 121 is currently inadequate, excessive, or wholly unnecessary. An adjusted configuration specification, such as 160, may be generated to cause analysis logic 150 to: a) gather more or less raw performance data about cable 121, b) digest the raw data differently or transform it into a different format, or c) initiate or discontinue monitoring of cable 121. In that way, health monitoring infrastructure of computer network 110 may adapt to changing conditions by dynamically: a) maximizing the relevance of telemetry, b) minimizing the cost (e.g. resource consumption or throughput degradation) of telemetry, and c) intelligently/optimally balancing between (a) and (b).

Step 206 re-provisions at least one virtual execution environment based on its generated configuration specification. For example at time T3, computer 100 sends configuration specification 160 to virtual execution environment 142 for adoption. In an embodiment, configuration specification 160 is sent to wholly replace a previous configuration of virtual execution environment 141. In an embodiment, only a delta (i.e. changes) are sent. In an embodiment, only a property file or data dictionary of parameter values (e.g. sensing and/or shipping interval and/or address, inclusion or exclusion list of metrics to gather or not) is sent.

Ideally, adjusted configuration specification 160 takes immediate effect without service disruption. Techniques and consequences of adjustment are discussed later herein.

3.0 Logic Template

Figure 3:
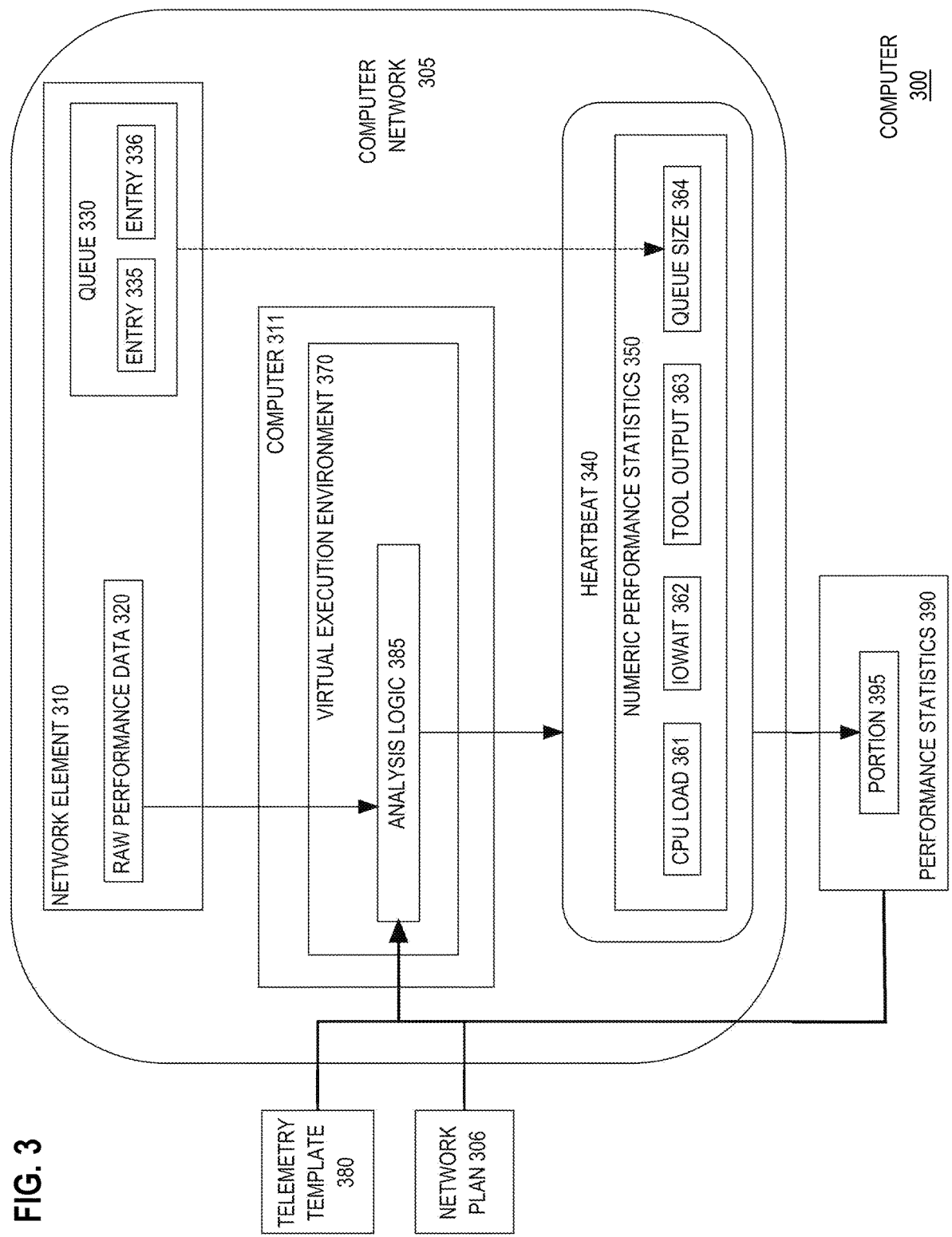
FIG. 3 is a block diagram that depicts an example orchestration computer that has templatized telemetry logic for gathering, transforming, and reporting performance data.

FIG. 3 is a block diagram that depicts an example orchestration computer 300, in an embodiment. Computer 300 has templatized telemetry logic for gathering, transforming, and reporting performance data. Computer 300 may be an implementation of computer 100.

Computer 300 monitors the health of computer network 305 based on performance data from network elements such as 310-311. Network element 310 observes its own performance to generate raw performance data 320. For example, network element 310 may have backlog queue 330 to absorb a demand spike for eventual processing. For example, network element 310 may be a network switch in a store-and-forward network such as a packet relay. Backlog queue 330 may accumulate pending work, such as entries 335-336, that may be commands or payload such as data packets in transit.

Raw performance data 320 may contain queueing statistics such as current queue size 364 that may be a count of entries 335-336 in backlog queue 330. Raw performance data 320 may also contain metrics such as central processing unit (CPU) load 361, input/output waiting (IOWAIT) 362, physical and virtual memory usage (not shown), and tool output 363 such as within textual console output or structured binary output. In an embodiment, raw performance data 320 contains output from at least one of: a process status query to an operating system, a system processing load monitor, and/or a system memory demand monitor.

Computer 311 hosts virtual execution environment 370 that hosts analysis logic 385 that monitors and/or collects raw performance data 320 of network element 310. Analysis logic 385 need not be hand crafted. For example, analysis logic 385 may be generated from telemetry template 380 that specifies generic logic that can be reused by providing specialization/customization parameters. For example, analysis logic 385 should be configured to monitor particular network element(s) and gather particular performance metrics of those network element(s) in a particular way. For example, telemetry template 380 may specify a telemetry retrieval mechanism, such as hypertext transfer protocol (HTTP) or a socket protocol, that can be used to transfer a variety of metrics from a particular category of network elements, such as a particular brand of network switches.

Computer 300 may extract topological details (e.g. identifiers, addresses, equipment types) from network plan 306 and use those extracted details to discover a network element, such as 310, and select telemetry template 380 for generating analysis logic 385 for monitoring network element 310. Computer 300 may configure (i.e. specialize) analysis logic 385 according to network plan 306 and performance statistics 390 that reflect the dynamic performance of computer network 305. For example, which of metrics 361-364 should analysis logic 385 collect may depend on network plan 306 and performance statistics 390. For example, network plan 306 may enumerate equipment types of network elements and potentially available performance metrics/statistics for those types. An equipment type may be identified by stock keeping units (SKU), which may be used as a lookup key for retrieving a listing of performance metrics that are or can be collected.

Once properly configured, analysis logic 385 may gather an interesting subset of raw performance data 320, perform some preliminary analysis of the data, and report the results in an appropriate format for inclusion (e.g. portion 395) into performance statistics 390. Although not shown, other virtual execution environments, within computer 311 or other computers, may monitor other network elements and contribute other portions into performance statistics 390.

Performance statistics 390 may be centrally maintained by computer 300. In an embodiment, analysis logic 385 sends some or all of the data of portion 395 within a periodic message such as heartbeat 340 to computer 300. Heartbeat 340 may contain numeric performance statistics 350 that contains various metrics 361-364. For example, each heartbeat 340 from analysis logic 385 may replace, update, or otherwise refresh portion 395 within performance statistics 390. Periodic heartbeat 340 may facilitate coordination and synchronization as explained later herein. In an embodiment, heartbeat 340 contains a process identifier that is assigned by either of: an operating system or a virtual execution environment. For example, analysis logic 385 may be associated with an identifiable software process or thread.

4.0 Lifecycle

Figure 4:
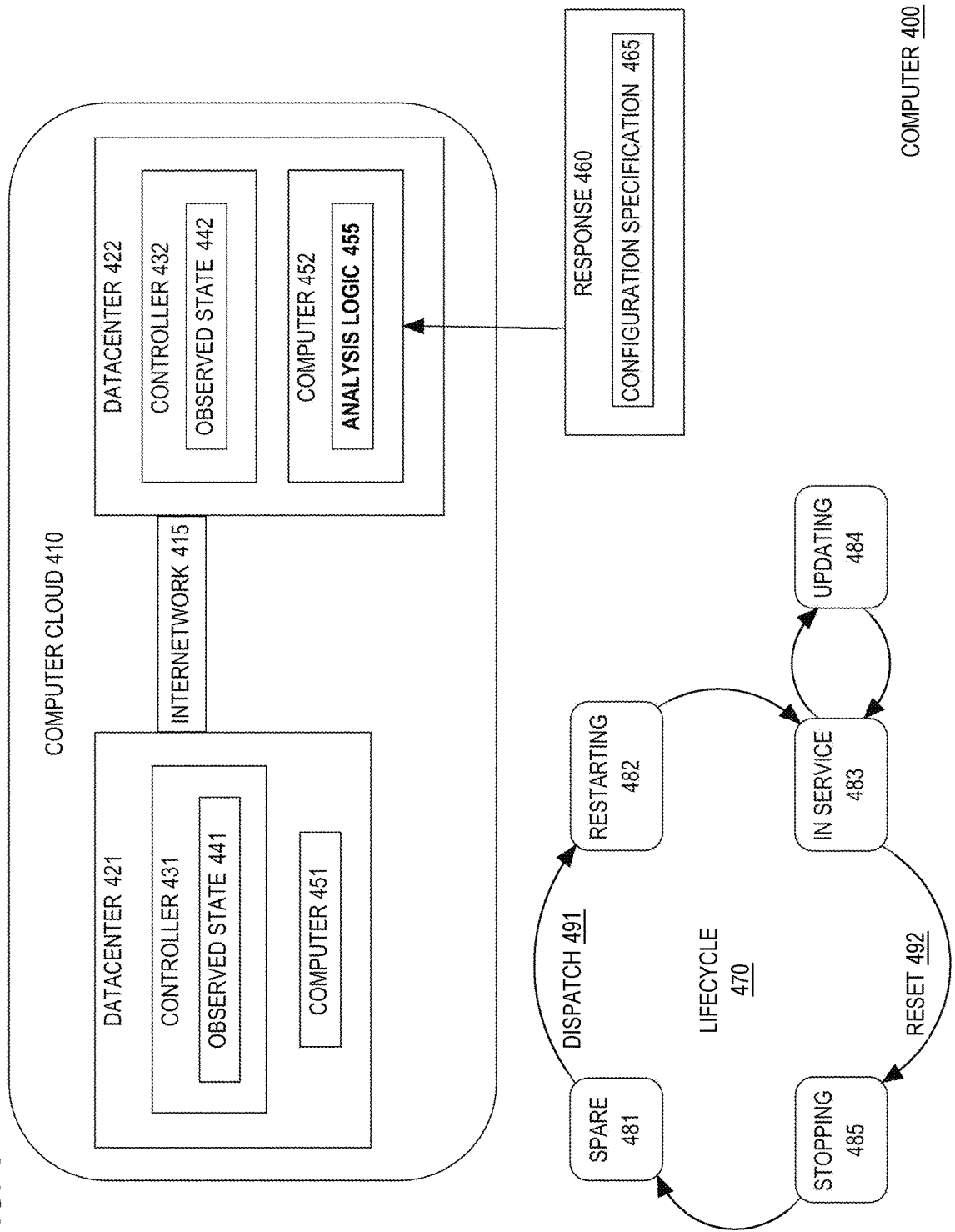
FIG. 4 is a block diagram that depicts an example orchestration computer that tracks a current state of a virtual execution environment according to a uniform lifecycle.

FIG. 4 is a block diagram that depicts an example orchestration computer 400, in an embodiment. Computer 400 tracks a current state of a virtual execution environment according to a uniform lifecycle. Computer 400 may be an implementation of computer 100.

Computer 400 monitors the performance health of computer cloud 410 based on telemetry agents such as analysis logic 455. Analysis logic 455 may need reconfiguring when the static configuration or dynamic performance of computer cloud 410 changes. For example as computer cloud 410 evolves, computer 400 may generate new configuration specification 465 to provide an initial configuration or a replacement configuration for analysis logic 455. For example, configuration specification 465 may contain a specialized (e.g. replacement) version of analysis logic 455, or may instead contain parameters that can tune or otherwise adjust already deployed analysis logic 455. For example if part of either internetwork 415 or datacenter 422 fails, configurations of virtual execution environments in surviving datacenter 421 may need adjusting.

Deployment, replacement, or adjustment of analysis logic 455 may occur according to a process that is asynchronous and more or less fragile. Asynchrony may arise because computers 400 and 452 are separate. Fragility may be a consequence of asynchrony and complexity such that proper behavior of configuring analysis logic 455 may depend on a stateful protocol for coordination based on mechanisms (not shown) such as handshake, watchdog, and heartbeat.

For example, analysis logic 455 may be hosted in a virtual execution environment (not shown) upon whose operation computer 400 may superimpose uniform lifecycle 470 to facilitate management and maintenance. In an embodiment, states 481-485 of lifecycle 470 may be more or less mutually exclusive such that availability of the virtual execution environment of analysis logic 455 may be limited to some state(s) for management and other state(s) for operation. For example, lifecycle 470 may reflect that the virtual execution environment is in or out of service.

For example, a virtual execution environment may be deployed and more or less ready, but without actually hosting any analysis logic at all, such as while idling in spare state 481. Computer 400 may review its own records to discover that the virtual execution environment is in spare state 481, or the virtual execution environment may report spare state 481 to computer 400, such as in a heartbeat that indicates current state. In an embodiment, a network element may receive status requests (e.g. polls) and answer by sending an HTTP response and/or a REST response that indicates the current state.

When computer 400 decides to dedicate the virtual execution environment to monitor a particular network element (not shown), computer 400 may send an event such as dispatch 491 to the virtual execution environment. In embodiments, dispatch 491 may or may not contain analysis logic 455 or a reference to analysis logic 455 such as a path to a script in a cross mounted filesystem.

Deployment of configuration specification 465 may entail one or more transitions between states of lifecycle 470, which may be event driven such as by events 491-492. For example, dispatch 491 may cause the virtual execution environment to transition from spare state 481 to restarting state 482.

In an embodiment, the virtual execution environment is launched and idling in spare state 481, such as within a pool of available spare virtual execution environments. In an embodiment, the virtual execution environment is not launched (i.e. spun up) until restarting state 482. For example, dispatch 491 may spawn a software process such as an operating system process.

In an embodiment, the virtual execution environment may enter restarting state 482 without analysis logic 455 and/or configuration specification 465. While in that state, the virtual execution environment may ask computer 400 to provide either of analysis logic 455 and/or configuration specification 465. For example, computer 400 may detect which virtual execution environment has made such a request and answer the request by sending an appropriate configuration specification 465 within response 460 to the virtual execution environment.

Upon receiving response 460, the virtual execution environment may: a) initiate execution of analysis logic 455 according to configuration specification 465, and b) transition from restarting state 482 to in service state 483 for full operation more or less indefinitely. In some or all states, the virtual execution environment may periodically send heartbeats to report its state. Thus, observers (i.e. heartbeat receivers) may dynamically track the state of a virtual execution environment within lifecycle 470, even when state transitions are asynchronous (e.g. deferred, unexpected, spontaneous, or autonomous).

A heartbeat may have multiple receivers. In an embodiment, each receiver has its own (e.g. transport control protocol TCP and/or REST) connection to the virtual execution environment over which copies of heartbeats flow. In an embodiment such as user datagram protocol (UDP), each heartbeat is multicast to multiple receivers. For example, a multicast heartbeat may be emitted without separate copies, and network routers may create copies as store-and-forward routes to different receivers diverge.

For example, state observers (i.e. heartbeat receivers) may be distributed controllers 431-432 and/or centralized orchestration computer 400. Multiple (e.g. replicated) state observers increases accuracy and availability of observed state. In an embodiment with at least three controllers, each controller votes which state the controller has recorded as a current state of a virtual execution environment. A majority state is promoted as a current state of the virtual execution environment by consensus.

Response 460 occurs when a virtual execution environment pulls configuration specification 465 while preparing for service. In another scenario, the virtual execution environment already operates in in-service state 483, and computer 400 more or less spontaneously pushes a replacement configuration specification to the virtual execution environment. In an embodiment not shown, there is no updating 484 state, and the virtual execution environment remains in in-service state 483 even when the virtual execution environment's configuration is adjusted or replaced. In the shown embodiment, the virtual execution environment may temporarily be taken out of service while the configuration changes during updating state 484.

Reasons for changing the configuration of a virtual execution environment include planned or unplanned changes of hardware or software capacity, or current or forecasted (e.g. scheduled) load fluctuation such as a hotspot, backpressure, or network weather. In an embodiment, various analysis logics, such as 455, seldom run, and there may be (e.g. at midnight) elastic horizontal scaling of virtual execution environments for a demand spike, followed by quiescence.

For example, computer 400 may send reset 492 to a virtual execution environment that reacts by transitioning from in-service state 483, to stopping state 485, and back to spare state 481 (e.g. return to a pool or terminate). Heartbeats and/or loss of heartbeat may indicate transitions. In an embodiment, a virtual execution environment emits heartbeats only when in-service state 483 or some subset of states of lifecycle 470. In an embodiment, a virtual execution environment emits heartbeats whenever operational, regardless of state in lifecycle 470.

5.0 Reconfiguration Process

Figure 5:
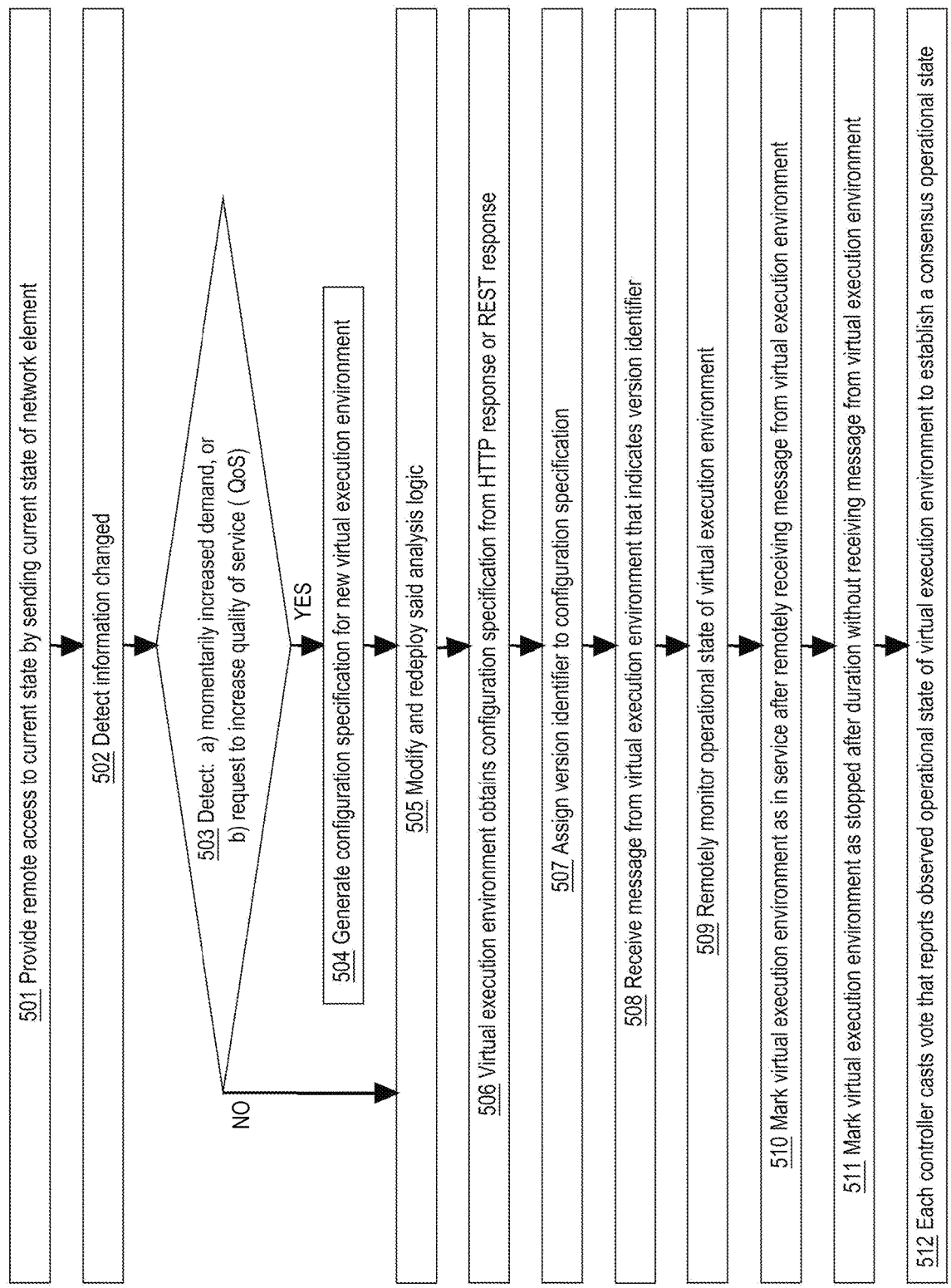
FIG. 5 is a flow diagram that depicts an example orchestration process for re-provisioning virtual execution environment(s) within a computer network.

FIG. 5 is a flow diagram that depicts orchestration computer 400 re-provisioning virtual execution environment(s) within a computer network, in an embodiment. FIG. 5 is discussed with reference to FIGS. 3-4. Computers 300 and 400 are a same orchestration computer in this example. The exhaustive flow of FIG. 5 is demonstrative. Depending on the embodiment, some steps of FIG. 5 may be combined, reordered, or absent.

Steps 501-503 entail some stimulation. For example, the orchestration computer may be triggered in various ways as follows. Step 501 provides remote access to a current state of a network element by sending performance data. For example, analysis logic 385 may periodically send numeric performance statistics 350 within heartbeats 340 to the orchestration computer.

Step 502 detects that relevant information changed. For example, the orchestration computer may detect that the static topology or dynamic performance (e.g. workload) of computer cloud 410 recently changed. For example, the orchestration computer may detect that queue size 364 within portion 395 now indicates saturation (i.e. overflow), which is a change that is both quantitative and qualitative.

In an embodiment, machine learning, declarative rules, and/or statistical analysis recognize various events and/or conditions as problematic or otherwise indicative of a need to reconfigure the health monitoring infrastructure itself, such as reconfiguring virtual execution environments. In an embodiment, machine learning, declarative rules, and/or statistical analysis facilitate selecting which reconfigurations may improve monitoring of the problematic condition.

Examples of machine learning algorithms, based on trainable models, include an artificial neural network (ANN) such as a multilayer perceptron (MLP) for deep learning (e.g. for complicated/multidimensional/multivariate problematic conditions), a recurrent neural network (RNN) (e.g. for a problematic temporal condition that requires recent history to recognize), a support vector machine (SVM), a decision tree or isolation forest, or ensembles (i.e. voting pluralities) of these. For example, performance statistics of a cloud as discussed herein, as accumulated and archived by a cloud heath monitoring system, may later be used for supervised or unsupervised training of a machine learning model.

Step 503 is a special case that detects whether or not (e.g. elastic) upscaling may be needed for the health monitoring infrastructure itself, perhaps due to a demand spike or an increased expected quality of service (QoS) and/or service level agreement (SLA). Vertical scaling may entail migrating (i.e. moving) the configuration of the existing virtual execution environment to a virtual execution environment of a computer of higher capacity, or merely increasing some parameter values of the existing virtual execution environment, such as granting more RAM, disk space, or processing cores.

Horizontal scaling may entail replicating an existing virtual execution environment, which may entail cloning the entire existing virtual execution environment, or merely copying its configuration to an idle (e.g. pooled) virtual execution environment. If horizontal upscaling or high availability is needed, then processing proceeds to step 504. If no upscaling or merely vertically scaling is needed, then processing proceeds to step 505.

Steps 501-503 may trigger a cascade of processing by the orchestration computer that may include any or all of steps 504-512. Step 504 generates a configuration specification for a new virtual execution environment. For example, virtual execution environment 370 may be replicated from computer 311 to another computer.

Step 505 configures or reconfigures content or properties of analysis logic, a virtual execution environment, and/or a host computer. In an embodiment, analysis logic 455 pulls configuration specification 465 in response 460 from the orchestration computer. In an embodiment, the orchestration computer sends response 460 upon receiving a heartbeat, such as 340, from analysis logic 455. In an embodiment shown as step 506, response 460 is an HTTP response and/or a REST response.

In an embodiment, the orchestration computer pushes configuration specification 465 to the host computer in a message such as a common gateway interface (CGI) request such as an HTTP get or post. In an embodiment, configuration specification 465 is accompanied by new or replacement analysis logic, such as a file path to a cross mounted script.

Step 507 assigns a version identifier to the configuration specification. For example, the orchestration computer assigns each new or adjusted configuration specification a unique serial number or timestamp. The orchestration computer may include the version identifier when sending the configuration specification, such as in step 505. For example, steps 505 and 507 may be combined. The orchestration computer may maintain configuration history for many analysis script deployments. In an embodiment shown as step 508, an analysis script may report its version identifier, such as in a heartbeat.

Step 509 remotely monitors the operational state of a virtual execution environment. For example, the orchestration computer may have taken the virtual execution environment out of service, and the virtual execution environment is restarting with a new or revised configuration. In an embodiment, the virtual execution environment restarts itself upon receiving a new or revised configuration specification.

In either case, the virtual execution environment may send message(s) (e.g. periodic heartbeats) that indicate which configuration version is operating and/or whether the virtual execution environment is in or out of service. That may cause a state observer, such as the orchestration computer, to mark the virtual execution environment as in service, shown as step 510.

Step 511 marks the virtual execution environment as stopped after a duration without receiving anything (e.g. heartbeat or other message) from the virtual execution environment. For example, the analysis script, virtual execution environment, or host computer may crash, and heartbeats may unexpectedly cease. The orchestration computer may try to restart the virtual execution environment or replicate its configuration onto a different host computer.

In step 512, each controller casts a vote that reports an observed operational state of a virtual execution environment to establish a consensus operational state. For example, internetwork 415 may be slightly unreliable, and controller 431 might not receive enough heartbeats to consider analysis logic 455 to be alive (i.e. operational).

If controller 431 wrongly assumes that a virtual execution environment is stopped, while a majority of other controllers have steadily received the heartbeats, then a vote of all controllers, including 431, can establish a consensus state of the virtual execution environment and/or of analysis logic 455 that is accurate. Controller 431 may observe the result of the vote. For example, consensus voting may heal some split brain scenarios.

6.0 Centralized State

Figure 6:
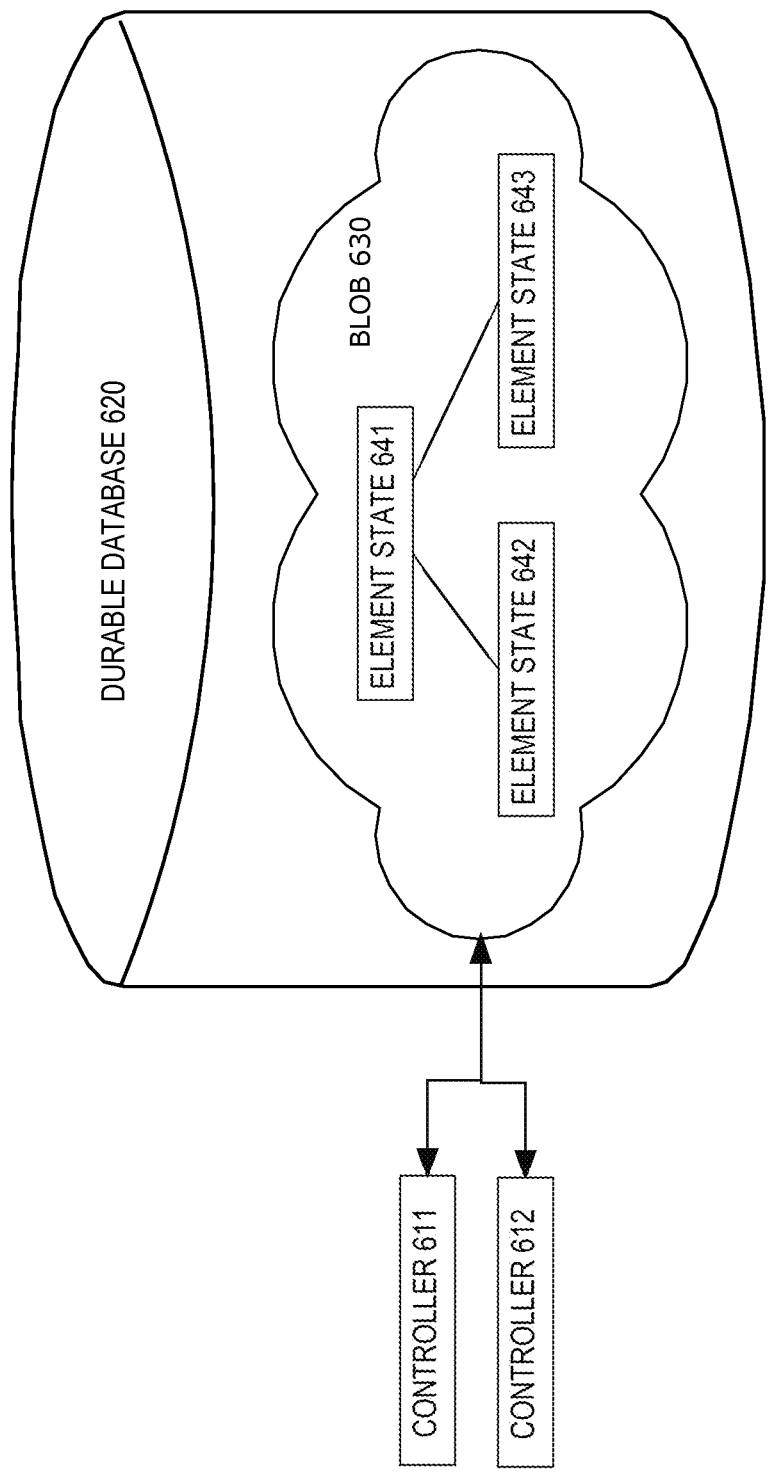
FIG. 6 is a block diagram that depicts an example computer network.

FIG. 6 is a block diagram that depicts an example computer network 600, in an embodiment. Computer network 600 has distributed controllers that curate shared centralized state. Computer 600 may be an implementation of computer 100.

Controllers 611-612 may be software processes in computer network 600 that remotely monitor lifecycles of virtual execution environments (not shown) of computer network 600. For example, element state 641 may represent a current state of a particular virtual execution environment. Element states 641-643 may be aggregated into a data structure such as a logical graph that may or may not reflect the (e.g. hierarchical) topology of computer network 600. That aggregate data structure may be externalized (e.g. serialized or otherwise marshalled) for storage as binary large object (BLOB) 630 within durable database 620 that may be a relational or NoSQL database or other non-volatile object store that is remotely available.

In operation, controllers 611-612 may independently transfer, cache, and/or adjust some or all of element states 641-643 to and from durable database 620. In an embodiment, BLOB 630 is necessarily transferred in its entirety. In an embodiment without BLOB 630, element states 641-643 have more or less complicated mappings for storage into relational table(s) or column family(s). For example, element states 641-643 may be queried or otherwise subjected to data manipulation language (DML). In an embodiment, adjustment and/or retrieval of element states 641-643 occurs within a (e.g. ACID: atomic, consistent, isolated, durable) transaction of durable database 620. In an embodiment, element states 641-643 are not cached in RAM of controllers 611-612, the orchestration computer, or virtual execution environments, and element states 641-643 are instead repeatedly retrieved from durable database 620 as needed.

In an embodiment, a centralized orchestrator process transfers and/or caches some or all of element states 641-643 to and from durable database 620. In an embodiment, the orchestrator transfers some or all of element states 641-643 to and from controllers 611-612. In an embodiment, element states 641-643 have additional information such as configuration details, performance metrics, element capabilities, capacities, element features, configured analysis logic, logic templates, and/or template parameter values.

7.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
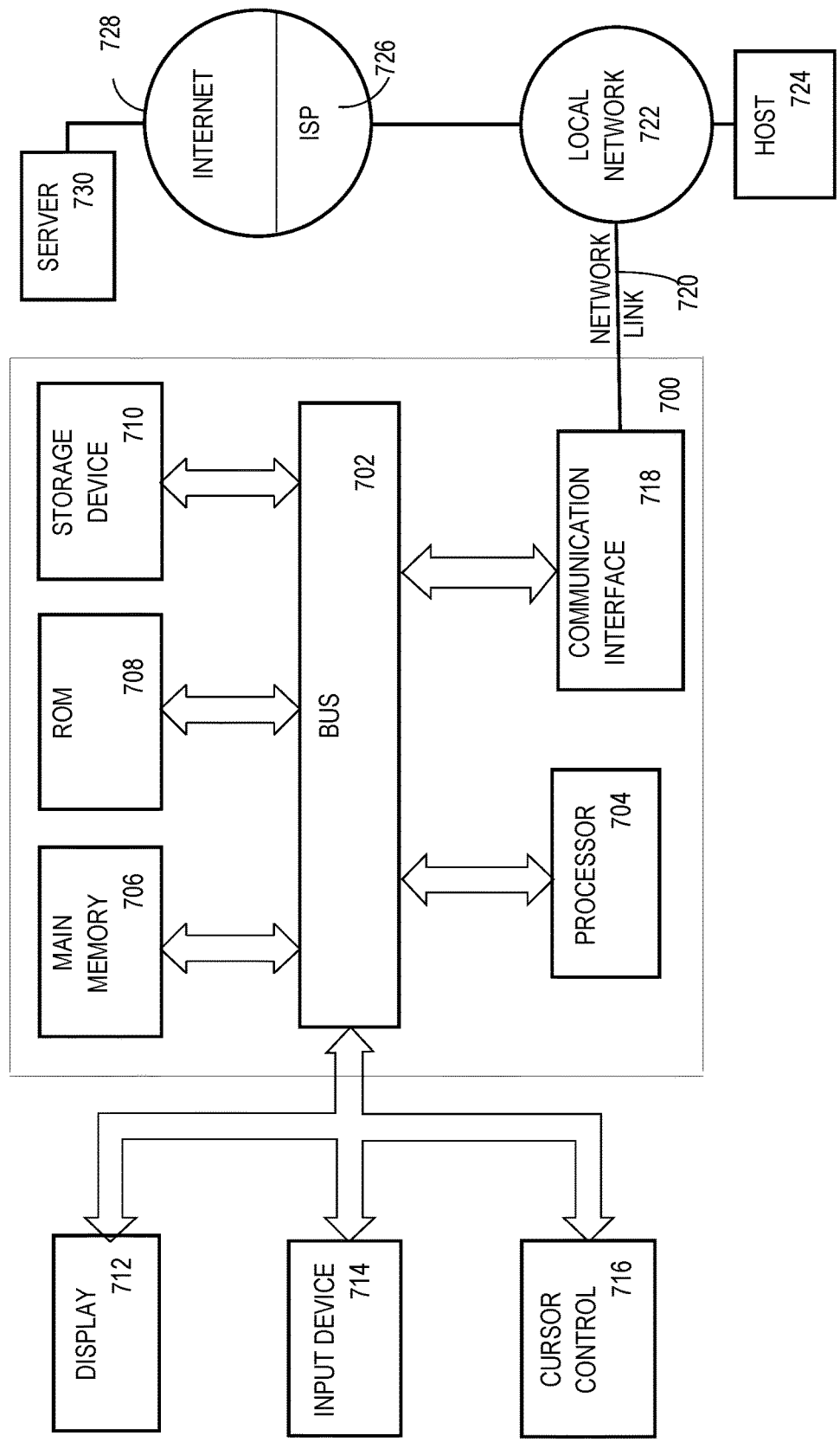
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

8.0 Software Overview

Figure 8:
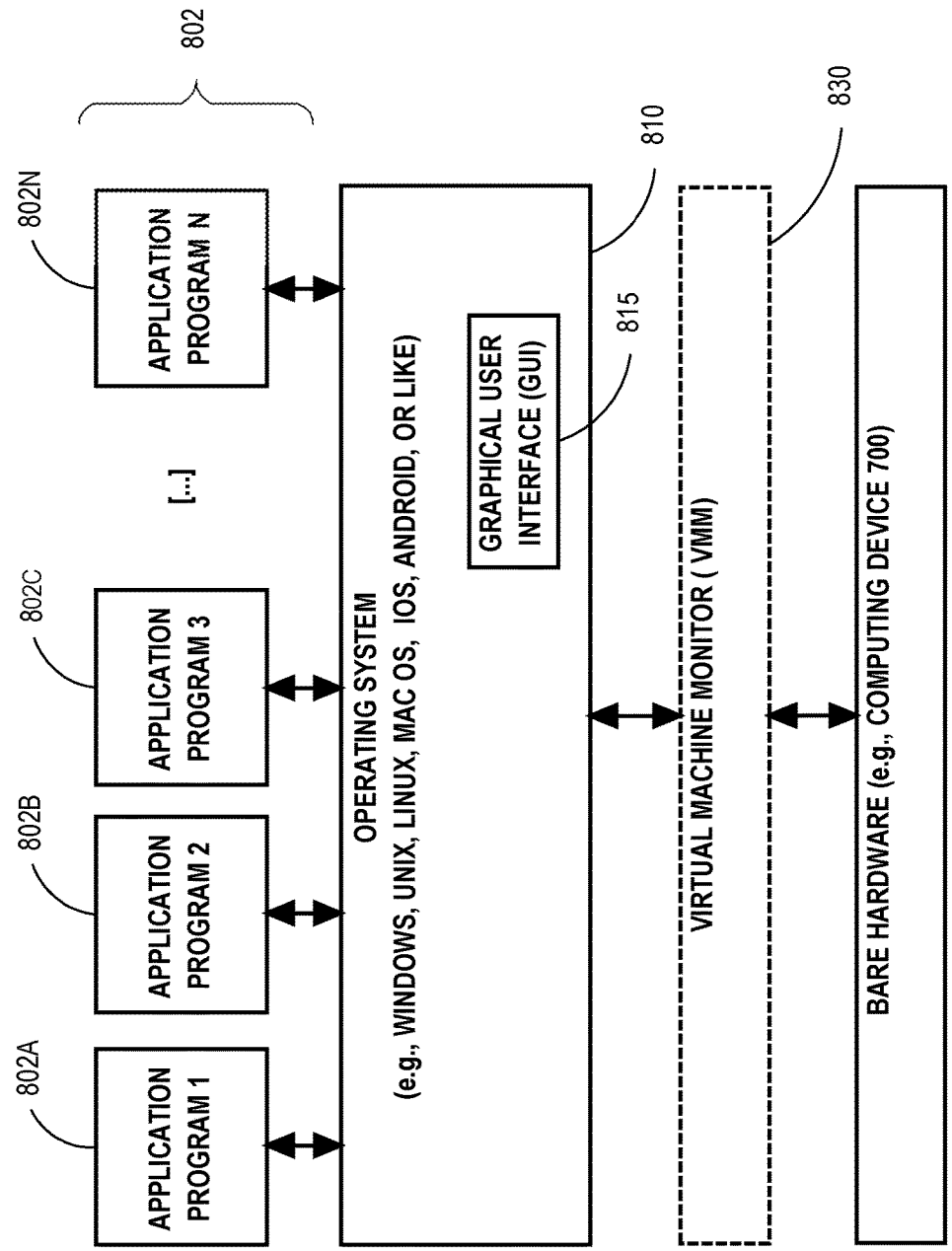
FIG. 8 is a block diagram that illustrates a basic software system that may be employed for controlling the operation of a computing system.

FIG. 8 is a block diagram of a basic software system 800 that may be employed for controlling the operation of computing system 700. Software system 800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 800 is provided for directing the operation of computing system 700. Software system 800, which may be stored in system memory (RAM) 706 and on fixed storage (e.g., hard disk or flash memory) 710, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 710 into memory 706) for execution by the system 800. The applications or other software intended for use on computer system 700 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 704) of computer system 700. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the computer system 700.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of computer system 800 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

9.0 Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    automatically detecting a current state of a plurality of network elements of a computer network by processing:
        a network plan that defines a topology of the computer network, and
        performance statistics of the plurality of network elements, wherein:
            the plurality of network elements includes a plurality of computers,
            each computer of the plurality of computers hosts one or more virtual execution environments,
            each virtual execution environment of the one or more virtual execution environments hosts respective analysis logic that transforms raw performance data of a network element of the plurality of network elements into a portion of said performance statistics;
    for each computer of the plurality of computers, automatically generating, based on said network plan and said current state of the computer network, a respective configuration specification for each virtual execution environment of the computer;
    for a particular virtual execution environment of the one or more virtual execution environments of a particular computer of the plurality of computers based on the configuration specification of the virtual execution environment;
        automatically re-provisioning the particular virtual execution environment, and
        automatically modifying and redeploying said analysis logic that is hosted on the particular virtual execution environment.

2. The method of claim 1 wherein each virtual execution environment of said one or more virtual execution environments of the particular computer comprises at least one selected from the group consisting of: a software jail and a software zone.

3. The method of claim 1 further comprising:
    generating, from a telemetry template that specifies a respective portion of said performance statistics to generate, for the particular virtual execution environment, said respective analysis logic that transforms said raw performance data;
    hosting said respective analysis logic on said virtual execution environment.

4. The method of claim 3 further comprising modifying, based on said telemetry template, said analysis logic that is hosted on a particular virtual execution environment.

5. The method of claim 1 wherein said automatically re-provisioning said particular virtual execution environment comprises
    remotely monitoring, for the particular virtual execution environment, a progress of each lifecycle states, including: stopping, restarting, in service, and updating while in service.

6. The method of claim 1 wherein:
    said current state of the plurality of network elements comprises a current state of a particular network element of the plurality of network elements;
    said network plan defines a current configuration of: a particular virtual execution environment, and a particular computer of the plurality of computers that hosts the particular virtual execution environment;
    said modifying said analysis logic that is hosted on the particular virtual execution environment is based on at least one of:
        said current state of the particular network element,
        said current configuration.

7. The method of claim 1 wherein said performance statistics are based on remote heartbeats that contain numeric performance statistics.

8. The method of claim 7 wherein said numeric performance statistics are based on said raw performance data that includes at least one selected from the group consisting of: a) central processing unit (CPU) load, b) input/output wait (IOWAIT), c) physical or virtual memory usage, and d) output from at least one selected from the group consisting of: a process status query to an operating system, a system processing load monitor, and a system memory demand monitor.

9. The method of claim 7 wherein:
    said computer network comprises at least one backlog queue that contains one or more units of work;
    said numeric performance statistics is based on said raw performance data that includes a count of said one or more units of work.

10. The method of claim 1 wherein said automatically detecting said current state of said plurality of network elements comprises:
    retrieving, from a durable database, a previous state of said plurality of network elements;
    updating, in the durable database, said previous state of said plurality of network elements based on said current state of said plurality of network elements.

11. The method of claim 10 further comprising performing, in a transaction of said durable database, one selected from the group consisting of:
    said updating said previous state in said durable database, and
    said retrieving said previous state from said durable database.

12. The method of claim 10 wherein the method is performed by a plurality of redundant controllers that share said durable database.

13. The method of claim 12 wherein said plurality of redundant controllers do not cache, in random access memory (RAM), said current state of said plurality of network elements.

14. The method of claim 10 wherein said updating in said durable database comprises serializing one selected from the group consisting of: a logical graph of objects and a binary large object (BLOB).

15. The method of claim 1 including, in response to detecting particular information has changed, performing at least one selected from the group conssiting of:
said automatically detecting said current state,
said automatically generating said configuration specification, and
said automatically re-provisioning said at least one virtual execution environment;
wherein said particular information comprises at least one selected from the group consisting of:
said current state of said plurality of network elements,
said network plan that defines said topology of the computer network,
said performance statistics of the plurality of network elements, and
said analysis logic that transforms said raw performance data.

16. The method of claim 1 wherein analysis logic that transforms said raw performance data comprises at least one selected from the group consisting of:
a text script comprising imperative statements, and
logic that processes a bit error rate of a communication cable.

17. The method of claim 1 wherein at least one selected from the group consisting of:
a compute cloud contains said computer network,
said computer network comprises an internetwork, and
said computer network comprises a plurality of datacenters.

18. The method of claim 1 further comprising providing remote access to said current state of said plurality of network elements.

19. The method of claim 18 wherein said providing remote access to said current state comprises sending a current state of at least one network element of said plurality of network elements in at least one selected from the group consisting of: a hypertext transfer protocol (HTTP) response, and a representational state transfer (REST) response.

20. The method of claim 1 further comprising generating a configuration specification for at least one new virtual execution environment in response to one selected from the group consisting of:
momentarily increased demand, and
a request to ensure high availability.

21. The method of claim 1 wherein the network plan describes particular performance statistics that are available for particular network elements of the plurality of network elements.

22. A method comprising:
automatically detecting a current state of a plurality of network elements of a computer network by processing:
a network plan that defines a topology of the computer network, and
performance statistics of the plurality of network elements, wherein:
the plurality of network elements includes a plurality of computers,
each computer of the plurality of computers hosts one or more virtual execution environments,
each virtual execution environment of the one or more virtual execution environments hosts analysis logic that transforms raw performance data of a network element of the plurality of network elements into a portion of said performance statistics;
for each computer of the plurality of computers, automatically generating, based on said network plan and said current state of the computer network, a configuration specification for each virtual execution environment of the computer;
automatically re-provisioning at least one virtual execution environment of the plurality of computers based on the configuration specification of the virtual execution environment by performing in sequence:
marking a particular virtual execution environment as stopped after a duration without receiving a first message from the particular virtual execution environment;
marking said particular virtual execution environment as in service after remotely receiving a second message from said particular virtual execution environment.

23. The method of claim 22 wherein said first message and said second message comprise at least one selected from the group consisting of: a heartbeat and b) process identifier that is assigned by one selected from the group consisting of: an operating system and a virtual execution environment.

24. The method of claim 22 wherein:
said automatically generating said configuration specification comprises assigning a version identifier to said configuration specification for a particular virtual execution environment;
remotely receiving a second message comprises remotely receiving a message from said particular virtual execution environment that indicates said version identifier.

25. One or more non-transitory computer-readable media storing instructions that, when executed by one or more processors, cause:
automatically detecting a current state of a plurality of network elements of a computer network by processing:
a network plan that defines a topology of the computer network, and
performance statistics of the plurality of network elements, wherein:
the plurality of network elements includes a plurality of computers,
each computer of the plurality of computers hosts one or more virtual execution environments,
each virtual execution environment of the one or more virtual execution environments hosts respective analysis logic that transforms raw performance data of a network element of the plurality of network elements into a portion of said performance statistics;
for each computer of the plurality of computers, automatically generating, based on said network plan and said current state of the computer network, a respective configuration specification for each virtual execution environment of the computer;
for a particular virtual execution environment of the one or more virtual execution environments of a particular computer of the plurality of computers based on the configuration specification of the virtual execution environment:
   automatically re-provisioning the particular virtual execution environment, and
   automatically modifying and redeploying said analysis logic that is hosted on the particular virtual execution environment.

26. The one or more non-transitory computer-readable media of claim 25 wherein each virtual execution environment of said one or more virtual execution environments of the particular computer comprises at least one selected from the group consisting of: a software jail, and a software zone.

27. The one or more non-transitory computer-readable media of claim 25 wherein the instructions further cause:
   generating, from a telemetry template that specifies a respective portion of said performance statistics to generate, for the particular virtual execution environment, said respective analysis logic that transforms said raw performance data;
   hosting said respective analysis logic on said virtual execution environment.

28. The one or more non-transitory computer-readable media of claim 27 wherein the instructions further cause modifying, based on said telemetry template, said analysis logic that is hosted on a particular virtual execution environment.

29. The one or more non-transitory computer-readable media of claim 25 wherein said automatically re-provisioning said particular virtual execution environment comprises remotely monitoring, for the particular virtual execution environment, a progress of each lifecycle states, including: stopping, restarting, in service, and updating while in service.

30. The one or more non-transitory computer-readable media of claim 25 wherein:
   said current state of the plurality of network elements comprises a current state of a particular network element of the plurality of network elements;
   said network plan defines a current configuration of: a particular virtual execution environment, and a particular computer of the plurality of computers that hosts the particular virtual execution environment;
   said modifying said analysis logic that is hosted on the particular virtual execution environment is based on at least one of:
      said current state of the particular network element,
      said current configuration.

31. The one or more non-transitory computer-readable media of claim 25 wherein said performance statistics are based on remote heartbeats that contain numeric performance statistics.

32. The one or more non-transitory computer-readable media of claim 31 wherein said numeric performance statistics are based on said raw performance data that includes at least one selected from the group consisting of: a) central processing unit (CPU) load, b) input/output wait (IOWAIT), c) physical or virtual memory usage, and d) output from at least one selected from the group consisting of: a process status query to an operating system, a system processing load monitor, and a system memory demand monitor.

33. The one or more non-transitory computer-readable media of claim 31 wherein:
   said computer network comprises at least one backlog queue that contains one or more units of work;
   said numeric performance statistics is based on said raw performance data that includes a count of said one or more units of work.

34. The one or more non-transitory computer-readable media of claim 25 wherein said automatically detecting said current state of said plurality of network elements comprises:
   retrieving, from a durable database, a previous state of said plurality of network elements;
   updating, in the durable database, said previous state of said plurality of network elements based on said current state of said plurality of network elements.

35. The one or more non-transitory computer-readable media of claim 34 wherein the instructions further cause performing, in a transaction of said durable database, one selected from the group consisting of:
   said updating said previous state in said durable database, or
   said retrieving said previous state from said durable database.

36. The one or more non-transitory computer-readable media of claim 34 wherein said updating in said durable database comprises serializing one selected from the group consisting of: a logical graph of objects and a binary large object (BLOB).

37. The one or more non-transitory computer-readable media of claim 25 wherein the instructions further cause, in response to detecting particular information has changed, performing at least one selected from the group consisting of:
   said automatically detecting said current state,
   said automatically generating said configuration specification, and
   said automatically re-provisioning said at least one virtual execution environment;
   wherein said particular information comprises at least one one selected from the group consisting of:
      said current state of said plurality of network elements,
      said network plan that defines said topology of the computer network,
      said performance statistics of the plurality of network elements, and
      said analysis logic that transforms said raw performance data.

38. The one or more non-transitory computer-readable media of claim 25 wherein analysis logic that transforms said raw performance data comprises at least one selected from the group consisting of:
   a text script comprising imperative statements, and
   logic that processes a bit error rate of a communication cable.

39. The one or more non-transitory computer-readable media of claim 25 wherein at least one one selected from the group consisting of:
   a compute cloud contains said computer network,
   said computer network comprises an internetwork, and
   said computer network comprises a plurality of datacenters.

40. The one or more non-transitory computer-readable media of claim 25 wherein the instructions further cause providing remote access to said current state of said plurality of network elements.

41. The one or more non-transitory computer-readable media of claim 40 wherein said providing remote access to said current state comprises sending a current state of at least one network element of said plurality of network elements in at least one selected from the group consisting of: a hypertext transfer protocol (HTTP) response, and a representational state transfer (REST) response.

42. The one or more non-transitory computer-readable media of claim 25 wherein the instructions further cause generating a configuration specification for at least one new virtual execution environment in response to one selected from the group consisting of:
    momentarily increased demand, and
    a request to ensure high availability.

43. The one or more non-transitory computer-readable media of claim 25 wherein the network plan describes particular performance statistics that are available for particular network elements of the plurality of network elements.

44. A method comprising:
    automatically detecting a current state of a plurality of network elements of a computer network by processing:
        a network plan that defines a topology of the computer network, and
        performance statistics of the plurality of network elements, wherein:
            the plurality of network elements includes a plurality of computers,
            each computer of the plurality of computers hosts one or more virtual execution environments,
            each virtual execution environment of the one or more virtual execution environments hosts analysis logic that transforms raw performance data of a network element of the plurality of network elements into a portion of said performance statistics;
    for each computer of the plurality of computers, automatically generating, based on said network plan and said current state of the computer network, a configuration specification for each virtual execution environment of the computer;
    automatically re-provisioning a particular virtual execution environment of the one or more virtual execution environments of a particular computer of the plurality of computers based on the configuration specification of the virtual execution environment;
    remotely monitoring, for particular virtual execution environment, a progress of each lifecycle state of a plurality of lifecycle states, including: stopping, restarting, in service, and updating while in service.

45. A method comprising:
    automatically detecting a current state of a plurality of network elements of a computer network by processing:
        a network plan that defines a topology of the computer network, and
        performance statistics of the plurality of network elements, wherein:
            the plurality of network elements includes a plurality of computers,
            each computer of the plurality of computers hosts one or more virtual execution environments,
            each virtual execution environment of the one or more virtual execution environments hosts analysis logic that transforms raw performance data of a network element of the plurality of network elements into a portion of said performance statistics;
    for each computer of the plurality of computers, automatically generating, based on said network plan and said current state of the computer network, a configuration specification for each virtual execution environment of the computer;
    each controller of a plurality of redundant controllers casting a vote that reports an observed operational state of a particular virtual execution environment of the one or more virtual execution environments of a particular computer of the plurality of computers to establish a consensus operational state of the particular virtual execution environment;
    automatically re-provisioning at least one virtual execution environment of the plurality of computers based on the configuration specification of the virtual execution environment.

\* \* \* \* \*

UNITED STATES PATENT AND TRADEMARK OFFICE
CERTIFICATE OF CORRECTION

PATENT NO.        : 10,892,961 B2
APPLICATION NO.   : 16/271535
DATED             : January 12, 2021
INVENTOR(S)       : Kocberber et al.

Page 1 of 2

It is certified that error appears in the above-identified patent and that said Letters Patent is hereby corrected as shown below:

On the Title Page

On page 2, Column 2, item (56), under Other Publications, Line 7, delete "Enterprose" and insert -- Enterprise --, therefor.

On page 2, Column 2, item (56), under Other Publications, Line 31, delete "Fesibility" and insert -- Feasibility --, therefor.

In the Specification

In Column 16, Line 65, delete "DbaaS" and insert -- DBaaS --, therefor,

In the Claims

In Column 17, Line 52, in Claim 1, delete "computers" and insert -- computers, --, therefor.

In Column 17, Line 54, in Claim 1, delete "environment;" and insert -- environment: --, therefor.

In Column 19, Line 11, in Claim 15, delete "conssiting" and insert -- consisting --, therefor.

In Column 20, Line 29, in Claim 23, after "of:" insert -- a) --.

In Column 20, Line 29, in Claim 23, before "process" insert -- a --.

In Column 21, Line 1, in Claim 25, delete "computers" and insert -- computers, --, therefor.

In Column 21, Line 13, in Claim 26, delete "jail," and insert -- jail --, therefor.

In Column 22, Line 18, in Claim 35, delete "or" and insert -- and --, therefor.

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,892,961 B2

In Column 22, Lines 36-37, in Claim 37, delete "one one" and insert -- one --, therefor.

In Column 22, Line 53, in Claim 39, delete "one one" and insert -- one --, therefor.

In Column 22, Lines 66-67, in Claim 41, delete "network element of said plurality of network elements in at least one".